United States Patent [19]

Bensette et al.

[11] 4,324,413
[45] Apr. 13, 1982

[54] UNICYCLE WITH WATER BALANCE

[76] Inventors: Leonard E. Bensette; Joann Bensette, both of 468 Rosedale Ave., Windsor, Ontario, Canada, N9C 2N4

[21] Appl. No.: 160,643

[22] Filed: Jun. 18, 1980

[51] Int. Cl.³ .............................................. B62K 1/00
[52] U.S. Cl. .................... 280/205; 280/1.13; 280/208; 280/281 R; 280/289 R; 180/21; D12/107
[58] Field of Search ........... 280/208, 205, 1.13, 280/281 R, 289 R; 180/21; D12/107

[56] References Cited

U.S. PATENT DOCUMENTS

| | | | |
|---|---|---|---|
| 88,683 | 4/1869 | Ward | 280/205 |
| 186,379 | 1/1877 | Stineman | 280/208 X |
| 2,169,391 | 8/1939 | Nilsson | 280/205 UX |

FOREIGN PATENT DOCUMENTS

| | | | |
|---|---|---|---|
| 2117349 | 4/1971 | Fed. Rep. of Germany | 280/208 |
| 1513176 | 1/1968 | France | 280/205 |

*Primary Examiner*—Joseph Paul Brust
*Attorney, Agent, or Firm*—Charles Krassov

[57] ABSTRACT

This invention consists of a unicycle having a rubber tire equipped double wheel, located within a light adjustable body which serves as a seat and a handle for holding onto. It is further equipped with a water container located between the double wheel, and at the base of the unicycle, in order to provide greater stability. The unicycle is operated by a pair of the usual bicycle pedals.

2 Claims, 4 Drawing Figures

U.S. Patent

Apr. 13, 1982

4,324,413

UNICYCLE WITH WATER BALANCE

Unicycles are usually used by performers in circuses or on the stage. This particular invention is for use by children as well as adults; and can be used as a plaything or for practical use in basic training. Its design provides greater stability, and greatly reduces lateral unbalance.

Figure 2:
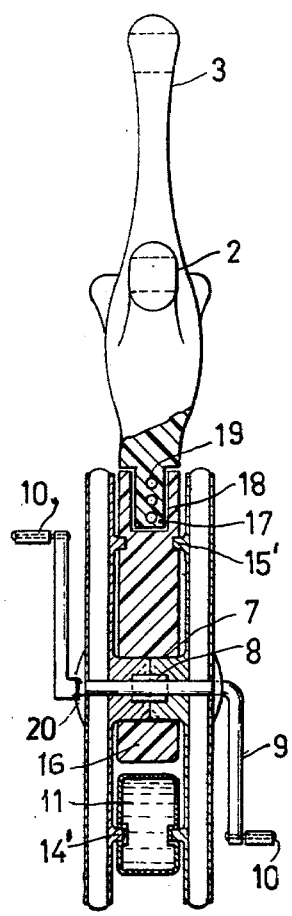
Figure 1:
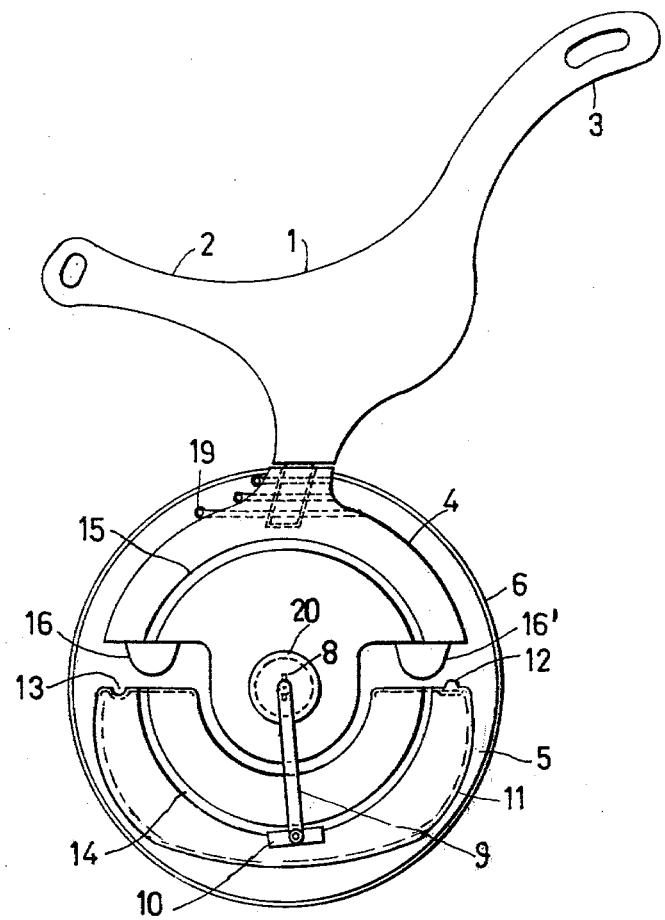
Figure 4:
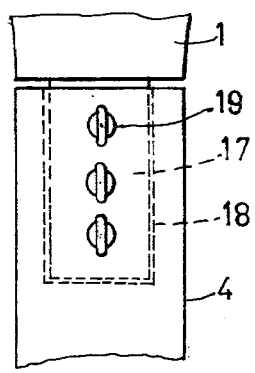
Figure 3:
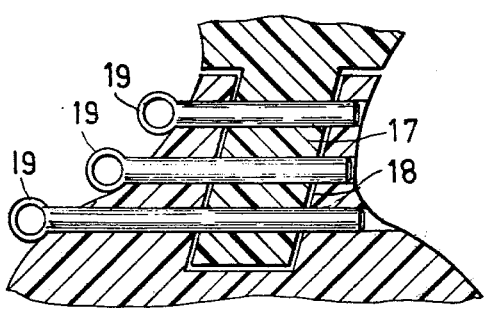

In describing the invention, reference will be made to the attached drawings in which, FIG. 1, is a side view of the invention with the facing wheel removed for clarity, FIG. 2, is an end view of the invention with some of the parts in section, FIG. 3, shows a section of the height adjustment mechanism, and FIG. 4, is an end view of FIG. 3.

The invention is shown in the FIG. 1 of the drawings, as having an upper body 1 which is usually shaped in the form of a colored bird or animal to make it attractive as a toy. The shape usually used provides a seat 2 and a hand grip 3.

A lower body 4 is circular at its top, it terminates short of a semi-circle, and extends at its center into a bearing for supporting the double wheel 5, with its rubber insert 6. Each half of the double wheel 5 is provided with a short hub 7, so that when the two hubs are assembled, they engage each other, and are locked together. Passing through the hubs 7 is a pedal shaft 9 to which a key 8 is attached, for locking said shaft to the hubs. Each opposite end of the pedal shaft 9 is provided with the usual type pedal 10.

On the inside of the double wheel is provided a semi-circular water container 11, which is located at the bottom of the unicycle and is equipped with a filling plug 12 on one end thereof, and with an air relief valve 13 at its other end. A channel 14, located centrally in each wall of the water container 11, and a similar, corresponding channel 15 is provided in the lower body 4. Bosses 14' and 15' engage their respective channels 14 and 15, thus retaining the water container 11 in its required bottom location. To prevent the said water container 11 from being carried around the wheel due to a tight contact between the wheel bosses 14' and 15' and the water container, a rubber bumper 16 on the left side and a similar bumper 16' on the right side are provided to the lower body 4, above the top of the water container 11.

The method of adjusting the height of the unicycle consists of providing a narrowed down extension 17 at the base of the upper body 1. This extension fits snugly into a cavity 18 in the upper part of the lower body, and the two bodies are joined together by a plurality of pins 19 which pass through holes common to both bodies. The height of the unicycle can be changed by relocating the pins through different combinations of the holes in the extension 17 and the cavity 18.

Circular cup-shaped covers 20 are provided to cover the holes through which passes the pedal bar 9.

It is obvious from the above description, that the water container would at all times be riding at the bottom of the unicycle and thus have a steadying effect on the unicycle generally and upon the rider in particular.

The rubber bumper 16 will help in absorbing shock and help considerably in adjusting the rider to a balanced position.

Learning to ride this unicycle can be accomplished easily and in a short period of time, due to the pendulum effect of the suspended water container, in the wheel, which always seeks its lowest level. The quantity of water used depends upon the required stability, so that the more proficient the rider becomes, the less water is required to provide the required degree of balance. The double walled wheel also helps the balancing.

Furthermore, when skill in riding this unicycle is acquired, there becomes practically no need to hold onto the unicycle, so that various games such as, hockey, polo, basketball, etc., can be played while riding the unicycle.

The unicycle can be made more attractive by painting the upper and lower bodies in various attractive designs and colors; and a hand brake can be installed when the rider becomes proficient.

Having described my invention what I claim is:

1. A unicycle comprising in combination, an upper body shaped to generally resemble a simplified side view of a bird, the rear tail end of which plus its back form a seat for the rider, and the forward and upward continuation of said back form the neck of said bird, by means of which the rider holds on and steers the unicycle; a lower body which serves to support the wheel of the unicycle is attached to the said upper body by means of a telescopic, pin-held, height adjustment connection, which takes care of the usual difference in height between different sized riders; a wheel consisting of two parallel, rubber tired, circular walls, which are spaced from each other, each of said walls having half of their common hub attached thereto; a horizontal pedal bar which passes through the center of said hub sections and is keyed to them, said horizontal pedal bar having one side thereof bent at right angles to it, to form a vertical support for one of the foot pedals; the other end of said horizontal pedal bar being provided with a removable and reattachable vertical support for the other foot pedal; a semi-circular water container located loosely between the spaced walls of the wheel, and held in suspension at the bottom of the unicycle at all times, during its use, by free moving bosses attached to the inside wheel walls, said bosses sliding freely within channels provided in the walls of said water container thereby keeping the water container suspended at the bottom of the unicycle; and bumpers of rubber or any other resilient material attached to the lower body, located above the said water tank, to prevent the water container from being pulled along by the rotation of the wheels; and said water tank being provided with a water filling plug and an air relief valve.

2. As set forth in claim 1, a means for the height adjustment of the unicycle which consists of a central extension from the base of the upper body which fits into a cavity in an upper extension of the lower body, and joins the two bodies rigidly by passing a plurality of pins through lined up holes in both bodies; the holes in the two bodies can be lined up in a manner to provide greater height to the unicycle.

* * * * *